United States Patent

Kremer et al.

[19]

[11] Patent Number: 6,102,234

[45] Date of Patent: Aug. 15, 2000

[54] CLOSURE FOR A FILLING TUBE OF THE TANK OF A MOTOR VEHICLE AND OPERATION METHOD

[75] Inventors: Adolf Kremer, Remseck; Dieter Scheurenbrand, Wolfschlugen; Reinhard Steinkämper, Winnenden, all of Germany

[73] Assignee: DaimlerChrysler AG, Stuttgart, Germany

[21] Appl. No.: 09/037,021

[22] Filed: Mar. 9, 1998

[30] Foreign Application Priority Data

Mar. 7, 1997 [DE] Germany .......................... 197 09 415

[51] Int. Cl.⁷ .............................. B65B 3/00; B65D 51/16
[52] U.S. Cl. ..................... 220/86.2; 220/203.19; 220/825; 220/DIG. 33; 137/312
[58] Field of Search ............... 220/582, 203.19, 220/203.29, 231, 810, 825, 827, 829, 830, 745, 746, 86.1, 86.2, 86.3, 89.1, 219, 212; 141/382, 312, 351, 352, 86; 222/108

[56] References Cited

U.S. PATENT DOCUMENTS

| | | |
|---|---|---|
| 4,714,172 | 12/1987 | Morris . |
| 5,238,034 | 8/1993 | Corfitsen . |
| 5,921,297 | 7/1999 | Kremer et al. ..................... 220/86.2 X |

FOREIGN PATENT DOCUMENTS

| | | |
|---|---|---|
| 3602844 | 1/1987 | Germany . |
| 3918947 | 12/1990 | Germany . |
| 4017912 | 12/1991 | Germany . |
| 195 04 265 | 8/1996 | Germany . |
| WO 96/33095 | 10/1996 | WIPO . |

OTHER PUBLICATIONS

Fuel Filler Cap, Research Disclosure, Aug. 1993, Joseph Fornuto et al., No. 352, p. 551 (XP000395278).

English Abstract of DE 4017912.

*Primary Examiner*—Stephen Castellano
*Assistant Examiner*—Niki M. Eloshway
*Attorney, Agent, or Firm*—Evenson, McKeown, Edwards & Lenahan, P.L.L.C.

[57] ABSTRACT

A closure for a filling tube of a motor vehicle with a swivel closure cover is arranged outside of a center opening of the filling tube in the tank and pivots around a swivel axis positioned in a plane perpendicular to the center axis of the opening. The closure is pre-stressed by a spring in a direction counter to the insertion movement of a filling pipe of a fuel supply nozzle. The closure is supported on a lower surrounding opening edge of the opening in the closed position to form a seal. An upstanding swivel facilitating element that can be contacted by the filling pipe is arranged on the closure. The closure cover is swiveled in a force-saving manner as a result of this swivel facilitating element. To achieve a safe and reliable closure operation of the closure cover for refuelling, and to reduce, as much as possible, an amount of force along the total insertion path of the filing tube, it is proposed to attach the swivel facilitating element to the upper side of the closure cover and to shape the element like a curved disc. The element has a guidance plane that faces the swivel axis. The highest geodetic position of the guidance plane, in the closed position, forms an end region farthest from the swivel axis of the course of the guidance plane that extends in the direction of the swivel axis. The swivel facilitating element is displaced from an edge of the closure cover in the direction of the closure cover center. An area section at the front of the filling pipe initially reaches the swivel facilitating element, during insertion into the filling tube, at an end region farthest from the swivel axis of the closure cover.

7 Claims, 4 Drawing Sheets

CLOSURE FOR A FILLING TUBE OF THE TANK OF A MOTOR VEHICLE AND OPERATION METHOD

BACKGROUND AND SUMMARY OF THE INVENTION

This application claims the priority of German Appln. No. 19709415.5-13, filed Mar. 7, 1997, the disclosure of which is expressly incorporated by reference herein.

This invention concerns a particular closure for a filling tube of the tank of a motor vehicle.

A closure of this kind is known from German patent publication DE 19,504,265 A1. The closure described in this publication includes a closure cover which can be swiveled around a swivel axis. This swivel axis extends perpendicularly in relation to a plane including the filling tube axis. An open position is obtained when the closure cover is swiveled down in the filling direction. In a closed position, the closure cover lies at the opening edge of the filling tube, sealing the tank inner space from the side. The swivel arrangement connected to the closure cover includes a lever. The lever is attached to a wall of the tank inner space so that it can be swiveled around the swivel axis. This axis extends through a slit from the outside into the filling tube. The lever is arranged such that it can be operated by the filling pipe of a nozzle. A torsional leg spring is arranged around the swivel axis and is supported by both the lever and a wall projection of the inner space of the tank. The lever extends in a direction opposite to that of insertion movement of the nozzle. The leg spring generates an opposing force during insertion of the nozzle. The lever is also connected at the bottom, by a joint, to a tip lever by handles. At one end, the lever has its swivel axis attached to the wall of the tank inner space. On the other end, the lever carries the closure cover.

When the lever is operated, the transmission rate between the lever and the tip lever is reduced as the open position enlarges so that relatively large swivel paths of the closure cover can be obtained with short shifting paths of the filling pipe. In connection with the leg spring, this allows a modified closing force for the closure cover which depends upon the shifting path of the filling pipe. As a result, the closure force is greatest when the cover is closed.

One disadvantage of this construction is that, in an insertion phase, when pushing open the closure cover, the greatest force has to be exerted. This is particularly inconvenient during manual refuelling. Sealing problems also occur in the slit through which the lever extends. The operating mechanism of the closure cover also requires a number of mechanical parts (shafts, levers, and handles). The operating mechanism, therefore, is expensive and quite complicated to assemble.

It is a primary object of the invention to develop a closure of the kind described above which provides an improved operation of the closure cover for refuelling. This operation requires application of the least amount of force possible on the total insertion path beyond the filling pipe while, at the same time, providing a safe and reliable closure which functions in a simple manner.

This object is attained by a particularly constructed closure for a filling tube of a fuel tank for a motor vehicle. A swivel closure cover is arranged outside of a center opening of the filling tube in the tank and is displaceable about a swivel axis positioned perpendicular to the center axis of the opening. A spring prestresses the cover in a direction against insertion movement of a filling pipe of a nozzle and into contact with a lower surrounding opening edge of the opening in a closed position to form a seal. A swivel facilitating structure that can be contacted by the filling pipe is arranged on the closure cover to assure that the closure cover is swiveled in a forcesaving manner. The swivel facilitating structure is provided on an upper side of the closure cover, is shaped as a curved disc, and has a guidance plane facing the swivel axis. The guidance plane has a highest geodetic position which, in the closed position, forms an end region of its course that extends in the direction of the swivel axis. The end region is arranged so as to oppose the swivel axis of the closure cover close to its edge. When the cover is in the closed position, the swivel axis lies opposite an end section, farthest from the swivel axis, which initially engages a front side of the filling pipe during an insertion phase.

A structure by which the closure cover is operated is provided directly on the closure cover at the farthest possible location from the swivel axis. As it is inserted, a filling pipe first comes into contact with this closure cover structure. A maximum lever arm for operation results, so that only a very small force must be exerted to swivel the closure cover from its closed position. By inserting the filling pipe further, the closure cover passes through various swivel positions and different insertion depths. The filling pipe moves into a guidance surface or "plane" on the cover structure and continues to move along this surface during the insertion movement. Initially, the filling pipe starts at an end region of the closure cover farthest from the swivel axis. The lever length is thereby reduced, but the lever effect associated therewith continues to increase. The amount of force needed for opening the closure cover, therefore, is kept as small as possible. At the same time, the area of the filling pipe closest to the swivel axis approaches the closure cover, so that the area of the guidance plane farthest away from the swivel axis lifts off from a certain insertion depth. The lever effect is transferred to the area lying on the guidance plane closest to the swivel axis. In this way, the lever effect is abruptly reduced, due to the relatively small lever length, and the amount of force needed suddenly becomes greater. The lever arm, however, becomes longer during the subsequent insertion movements of the filling pipe, so that the area neighboring the end region farthest from the swivel axis is guided toward the guidance plane. At the same time, a wedge effect provided by the inserted filling pipe supports the opening, so that the corresponding amount of direct impact force needed for inserting the filling pipe or for swiveling the closure cover connected thereto is reduced considerably. In this way, the opening of the closure cover is reached in the installation of the end region farthest from the swivel axis on the side (cylinder jacket) of the filling pipe. The expensive lever mechanism previously required can be eliminated. Construction space is saved, and the number of components is reduced as well. At the same time, assembly of the closure is simplified, and simple retrofitting with swiveling elements according to the invention is always possible. Such a retrofitting can start from a conventional construction without the force-saving swiveling structure of the invention.

Furthermore, by eliminating the plurality of parts, and by placing the swiveling structure within the opening without constructive penetration of the opening wall by an operating lever, sealing problems resulting from such penetration are eliminated. A pre-stressed closure spring can be used to exert a relatively high closing force due to the high lever effect. A safe and reliable closure is achieved, and a particularly good seal is obtained by the pressure the closure cover exerts against the edge of the opening because of the spring force. The high incidence of flaws in the hermetic closure that formerly resulted from the plurality of parts is eliminated. Improved reliability and a safer and longer service life are provided to the motor vehicle as a result.

Other objects, advantages and novel features of the present invention will become apparent from the following detailed description of the invention when considered in conjunction with the accompanying drawings.

Each of FIGS. 3–7 shows the tank filling tube in side longitudinal section as it cooperates with the closure of the invention.

DESCRIPTION OF THE PREFERRED EMBODIMENT

Figure 1:
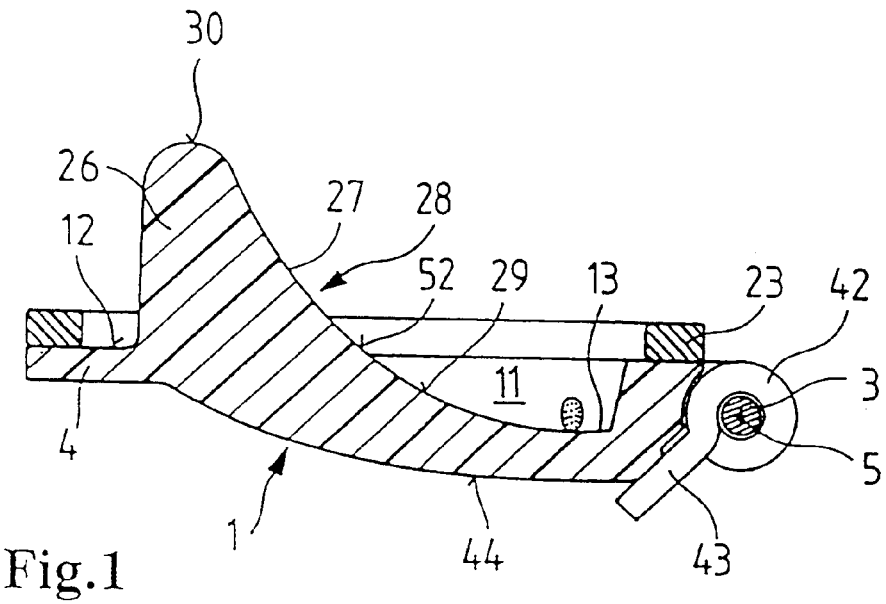
FIG. 1 is a side longitudinal sectional view of the closure cover for the closure of the invention.

A closure cover 1, shown in FIG. 1, is used for closing a filling tube 2 of the tank of a motor vehicle. The kinematics of the swiveling movement of the closure cover 1 are such that manual refuelling and robot-guided automatic refuelling can be carried out simply and without particularly great exertion.

Figure 2:
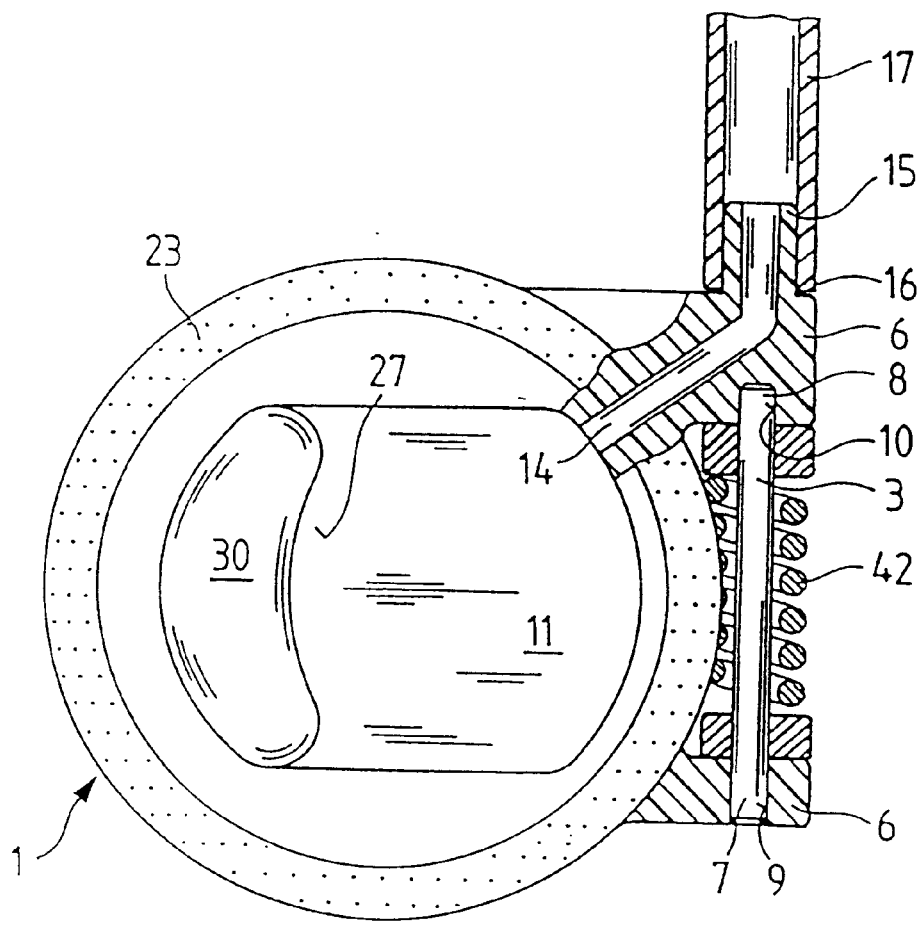
FIG. 2 s a plan view of the closure cover of FIG. 1.

For this purpose, a shaft 3 is installed at the edge 4 of the closure cover 1. The shaft 3 has a center axis that forms the swivel axis 5 of the closure cover 1 in a space-saving manner. Two holding crosspieces 6 are formed on the edge 4, are positioned to the side of the closure cover 1, and are parallel to and oppose each other. The crosspieces 6 have bearing receivers 9, 10 for the ends 7, 8 of the shaft 3. As is shown in FIG. 2, the swivel axis 5 runs, in a space-saving way, tangentially to the essentially surrounding circular edge 4 of the closure cover 1. This is permitted by the elimination of connecting components between the swivel axis 5 and the closure cover 1.

The closure cover 1 has a collection recess 11 for condensation and/or rain water. The recess 11 is formed at the swivel axis 5 close to the edge on the upper side 12 of the closure cover 1. A drainage channel 14 leads from the bottom 13 of the collection recess 11. The drainage channel 14 runs inside the cover edge 4 and ends in a hose connection tube 15 at one of the holding crosspieces 6 at its bearing receiver 9 of the shaft 3 facing away from the side 16. A hose-like drainage line 17 made, for example, of silicone, is pulled over the tube 15. The line 17 has another end 18 (FIGS. 3–7) that is inserted on a connection tube 20 that is shaped like a pipe arc and installed on the inside 19 of the hermetic filling tube 2. The filling tube 2 has an outlet opening 21 located at the attachment end 22 of the connection tube 20 where the collected water can exit from the tank. By providing a collection recess 11, a continuous transfer to the guidance plane 27, and drainage to the outside through the line formed by the drainage channel 14 and the drainage line 17, no water collects at any time on the cover 1. Such water would otherwise penetrate through the closure cover 1 at its surrounding edge 4 and into the tank. Leakage of the water, in other words, would be produced due to its counterproductive effect on the closure force of the closure cover 1 and consequent opening weight, along with its leaking properties. Thus, the reliability of the closure for preventing unwanted penetration of polluting substances, or substances that may in any way impair the fuel in the tank, is essentially ensured. An elastomeric flat seal 23 is specially glued and installed at the edge 4 of the upper side 12 surrounding the closure cover 1. Wetting the seal 23 with water allows sealing of the closure. A secure closure, therefore, is achieved. The described closure arrangement also precludes the possibility that, when the closure cover 1 is opened by a filling pipe 24 of a tank nozzle 25, water might enter into the tank without impediment.

In the connection facing the swivel axis at the collection recess 11, the closure cover 1 has a nose-like curved protrusion or "disc" 26 on its upper side 12. The protrusion defines a swivel facilitating structure as will become clear. The protrusion, however, may also be a specially shaped component and can be attached to the closure cover 1. The curved disc 26 has a guidance area 27 facing the swivel axis 5. The area 27 forms a concave "dome" 28. The course of the dome 28 extends continuously to the end region 52 of the guidance area 27, which is closest to the swivel axis, and smoothly merges into the course of the connecting wall 29 of the collection recess 11 of the closure cover 1. The curved disc 26 has a elevated tip-like end region or apex 30 at the location farthest from the swivel axis. The end region or apex is generated here due to the dome 28 of the guidance plane 27. In principle, however, other courses of the guidance plane 27 also extend from this elevated end region 30 to the swivel axis 5 with decreasing height of the curved disc 26.

Figure 3:
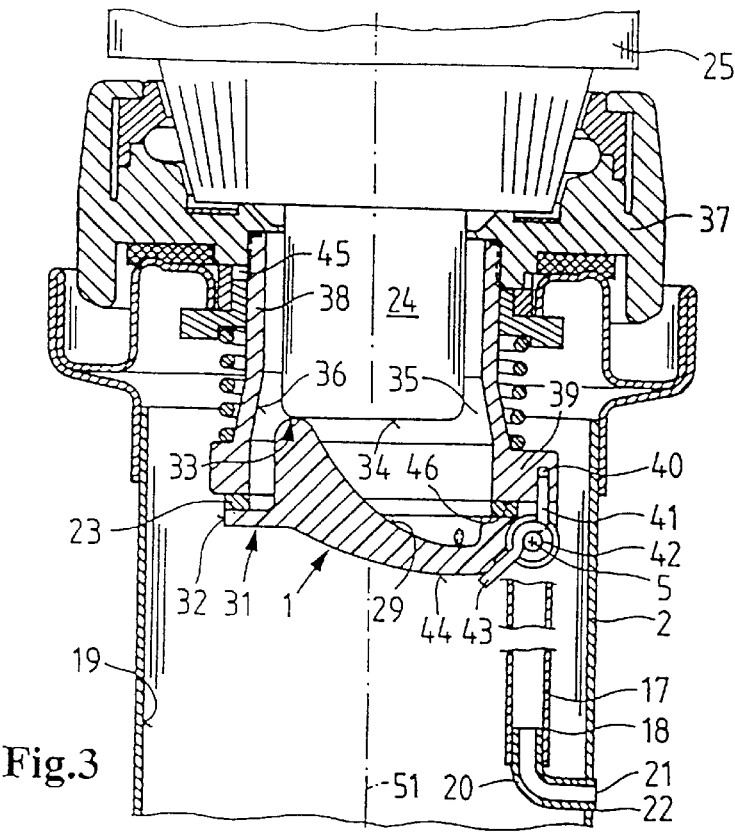

FIG. 3 shows the closure position of the installed closure cover 1. The end region 30 farthest from the swivel axis of the guidance plane 27 assumes its highest geodetic position. The end region 30 is kidney shaped as can be seen in the plan view of FIG. 2. The end region 30 is displaced by a distance toward the swivel axis 5 from the edge area 31 that lies closest to the side 32 of the closure cover 1 and that faces away from the swivel axis. This distance is selected or measured so that the filling pipe 24, when inserted in the filling tube 2, initially arrives at an area section 33 farthest from the swivel axis of its front side 34 at the end region 30 of the guidance plane 27. With respect to the swivel axis 5 of the closure cover 1, the height of the end region 30 farthest from the swivel axis of the guidance plane 27 is dimensioned so that the swivel radius of the end region 30 is smaller than the neighboring end region 31 farthest from the swivel axis of the closure cover 1 positioned in the closure position at the location of an opening 35 of a radially delimiting wall 26 of the filling tube 2. A clamping-free swiveling of the closure cover 1, providing a reliably secure closure, is ensured. The filling pipe, therefore, can be inserted into the filling tube 2 without impediment.

FIG. 3 shows that the filling tube 2 has a docking top 37 for a nozzle 25 of a tank robot. The docking top 37 can be screwed onto the filling tube 2 as a removable quarter-turn fastener. The docking top 37 has a centered hollow cylindrical element 38 that widens conically toward the interior of the tank. The element 38 has an axial gap 40 arranged at the front side of its lower end 39. A leg 41 of a torsional leg spring 42 is clamped in the gap 40 and is wound concentrically around the shaft 3 contained in the swivel axis 5. The other leg 43 of the spring is supported on the lower side 44 of the closure cover 1. In this way, the closure cover 1 and the shaft 3 are held operationally secure within the filling tube 2 arranged, near its upper mouth opening 45, around the element 38.

This arrangement permits the closure cover 1 to be operated manually as well as by a refuelling robot. The closure cover, together with the shaft 3, can be retrofitted easily in a simple manner for conventional tank filling tubes and for exchange when a defect is present. The attachment to the element 38 also simplifies the placement of the closure cover 1 near the mouth opening 45 of the filling tube 2. This makes possible a space-saving reduction of the filling pipe length and a reduction of the insertion time of the filling pipe 24 so that refuelling requires less time.

The inner wall 36 of the element 38 delimits the opening 35 of the filling tube 2 through which the filling pipe 24 of the nozzle 25 is inserted. The closure cover 1 is shown in FIG. 3 in a closed position and lying spring-stressed directly against the insertion movement of the filling pipe 24. A pre-stressed condition is produced by the leg spring 42. A seal is formed by the elastomer seal 23 at the front side 46 of lower end 39 of the element 38 that forms the surrounding opening edge of the opening 35. The filling pipe 24 is inserted far enough into the opening 35 so that it sits with its area section 33 farthest from the swivel axis of the front side 34 on the end region 30 of the guidance plane 27 of the curved disc 26. In the described construction of the closure cover 1, the swivel axis 5 is arranged outside of the clear diameter of the central opening 35 of the filling tube 2 in the tank, and lies perpendicular to and laterally displaced from the center axis 51.

Figure 4:
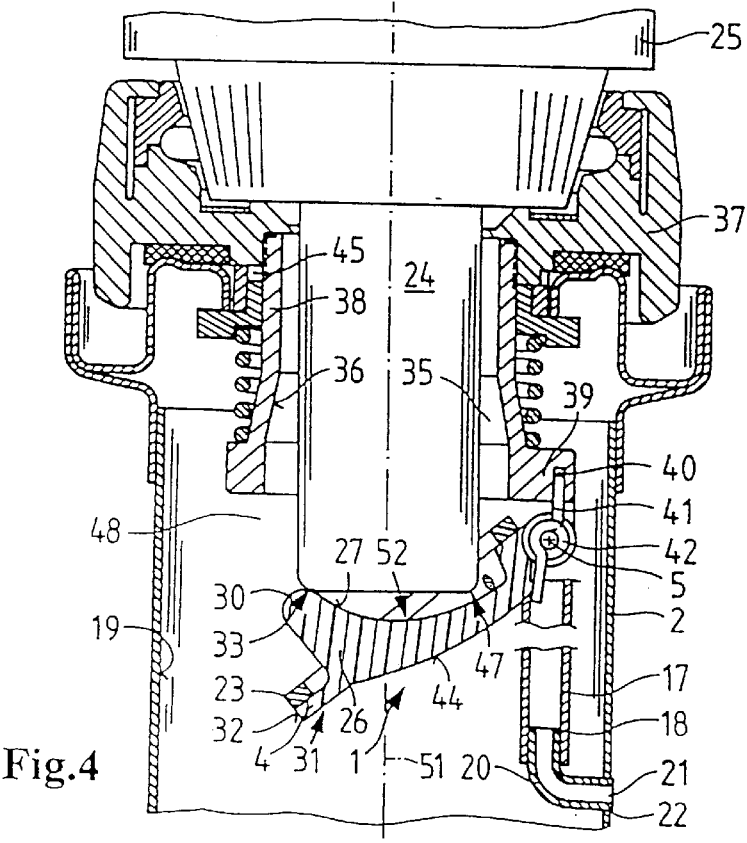

When the filling pipe 24 according to FIG. 4 is inserted further, the closure cover 1 is pressed open and swiveled away, by impact of the pipe with the area section 33, against the spring force of the leg spring 42. Therefore, the filling pipe 24 comes close to the closure cover 1 with its area section 47 closest to the swivel axis, while the area section 33 farthest from the swivel axis runs out at the end region 30 of the guidance plane 27 of the curved disc 26 in the direction of the swivel axis 5. The concave dome 28 of the guidance plane 27 prevents premature contact of the area section 47 closest to the swivel axis of the filling pipe 24 with the closure cover 1. In this way, the greatest possible leverage is provided for as long as possible in the swivel phase by the area section 33 farthest from the swivel axis of the filling pipe 24 at the closure cover 1. A reduction in the amount of force needed for swiveling away or opening the closure cover 1 is brought about in this manner. The curved disc 26 forms the swiveling structure for the closure cover 1, so that the filling pipe 24 operates directly and immediately to produce swiveling due to the adaptation of the curved disc 26 to the closure cover 1.

Figure 5:
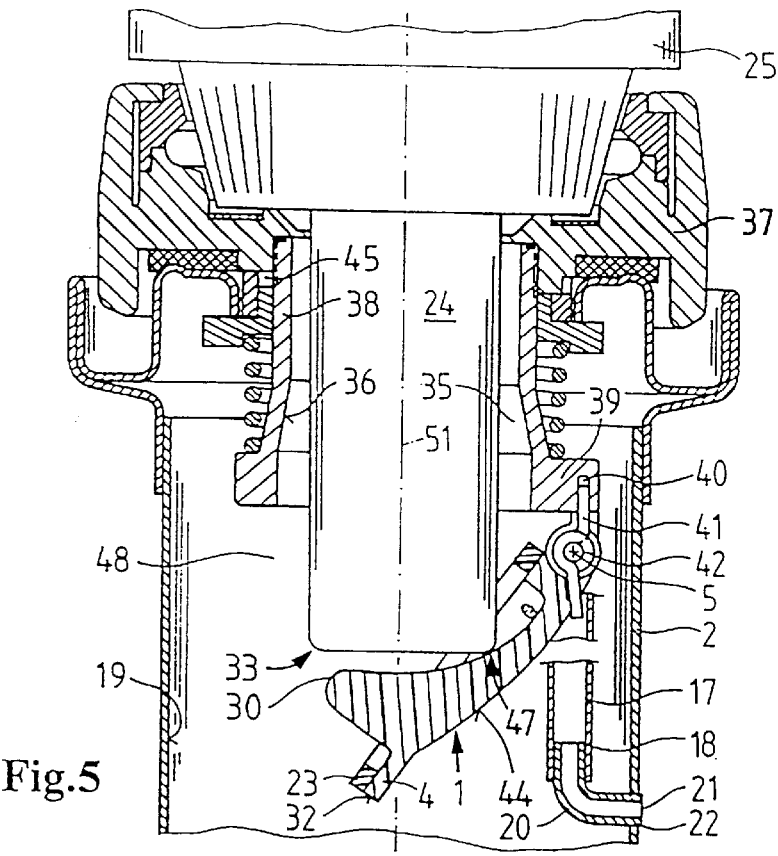

With further insertion movement of the filling pipe 24, the area section 47 of the pipe 24 closest to the swivel axis reaches the closure cover 1 in the region of its collection recess 11. The closure cover 1 is at this time lifted from the area section 33 farthest from the swivel axis of the filling pipe 24 (FIG. 5). In this way, a transition to a shorter lever arm results, which temporarily requires a greater amount of force than would normally be needed for a further swiveling of the closure cover 1. This additional requirement is, however, counteracted by the simultaneous appearance of the wedge effect of the filling pipe 24 in the through opening 48, which is opened by the swiveling of the closure cover 1 from its closed position.

Figure 6:
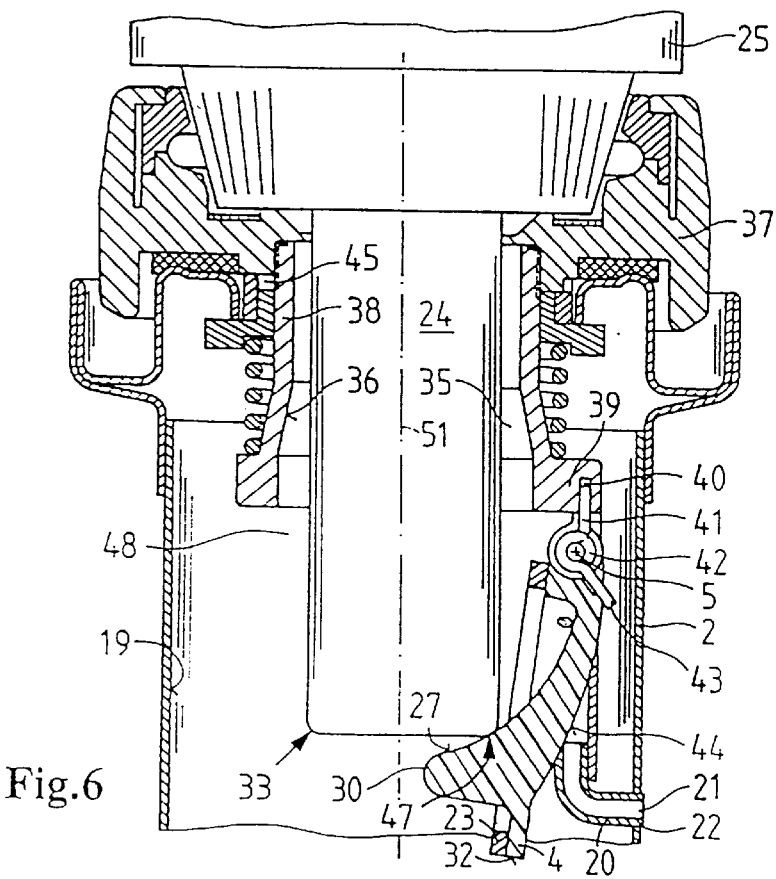

If, according to FIG. 6, the filling pipe 24 is inserted further into the opening 35, then the area section 47 closest to the swivel axis of the filling pipe 24 shifts outwardly during its swivel movement along the guidance plane 27 toward its end region 30 farthest from the swivel axis. The lever arm enlarges continuously and the required effective lever force becomes greater for a further opening or swiveling of the closure cover 1. The amount of force needed therefore diminishes continually.

Figure 7:
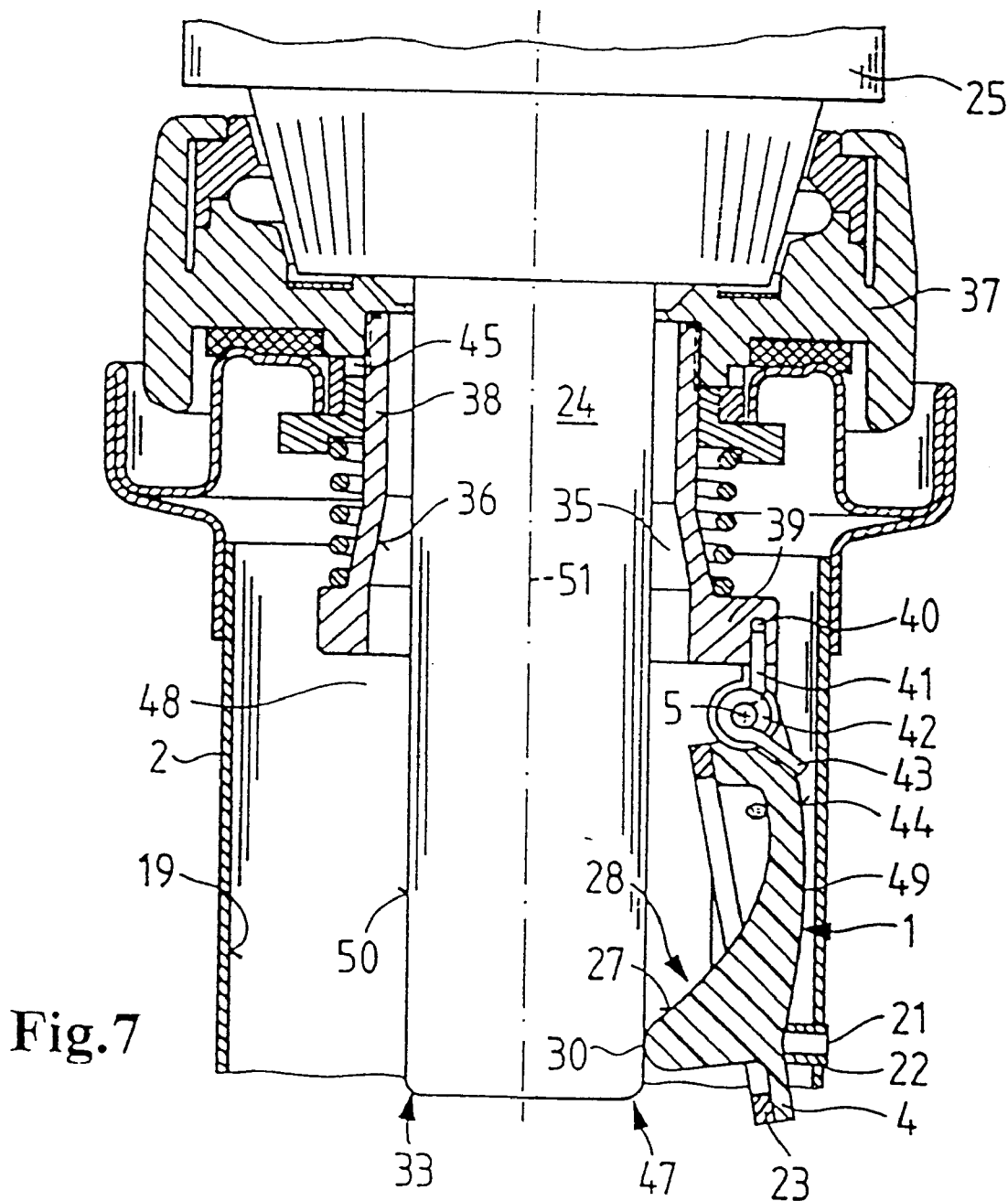

The filling pipe 24 is shown in FIG. 7 at its maximum insertion depth and, therefore, in the filling position. The closure cover 1 is swiveled downward into its open position from its closed position. The end region 30, at its farthest location from the swivel axis, lies outside of the sweeping region of the filling pipe 24, and is located in the vicinity of the inner side 19 of the filling tube 2. Therefore, should normal operation procedures not be followed, the lower side 44 of the closure cover 1 is structured so that there is a safe distance between the apex 49 of the dome and the inner side 19 of the filling tube 2 in the open position of the closure cover 1. Insertion of the filling tube 24 in the last filling phase is not inhibited by the closure cover 1 due to contact of its domed lower side with the inner side 19 of the filling tube 2. The reliable domed shape of the lower part 44 of the closure cover 1, however, must always be dimensioned appropriately relative to the height of the end region 30 farthest from the swiveling axis of the guidance plane 27. As the distance between the end region 30 and the position of a plane traversing the insertion direction of the filling pipe 24 in the closure cover 1 through the almost circular edge 4 increases, the lower side 44 should be less domed or convex. In the open position of the closure cover 1, the end region 30 of the guidance plane 47 of the filling pipe 24 slides outward and lies at the outer perimeter 50 of the filling pipe 24.

Movement of the closure cover 1 from its open position to its closed position by swiveling is carried out according to the previously described movement steps but in reverse order. When the filling pipe 24 is pulled out of the filling tube 2, the closure cover 1 is driven by the leg spring 42 into the closed position and is pressed against the element 38 to provide a seal at the edge of the opening 35.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. A fuel tank access closure comprising:
a docking element secured to a fuel tank inlet and defining a central passage for a fuel dispensing nozzle,
a closure cover pivotally connected to said docking element and engagable by the nozzle, and
a spring biasing said closure cover into engagement with a terminal end of said docking element,
said closure cover including a cam surface defined thereon producing a large opening torque to pivot the closure cover to an instantly open position followed by smaller pivotal torque as the fuel dispensing nozzle travels sequentially into said central passage,
wherein said cam surface defines a recess for collecting liquid and said closure cover includes a passage defined therein through which the liquid is discharged from the recess.

2. The closure according to claim 1, and further comprising a drainage hose connected to said passage for discharging said liquid.

3. The closure according to claim 1, wherein said closure cover comprises a seal surrounding the central passage when the closure cover is in a closed position.

4. The closure according to claim 3, and further comprising a drainage hose connected to said passage for discharging said liquid.

5. The closure according to claim 1, and further comprising a hollow element forming part of said docking element defining said terminal end.

6. The closure according to claim 5, wherein said spring has a first end secured to said hollow element and a second end abutting said closure cover.

7. A closure for a filling tube of a fuel tank for a motor vehicle comprising:

a swivel closure cover arranged outside of a center opening of the filling tube in the tank and displaceable about a swivel axis positioned perpendicular to the center axis of the opening, a spring prestressing the cover in a direction against insertion movement of a filling pipe of a nozzle and into contact with a lower surrounding opening edge of the opening in a closed position to form a seal, and a swivel facilitating structure that can be contacted by the filling pipe arranged on the closure cover to assure the closure cover is swiveled in a force-saving manner, wherein the swivel facilitating structure is provided on an upper side of the closure cover and is shaped as a curved disc, the swivel facilitating structure has a guidance plane facing the swivel axis, the guidance plane has a highest geodetic position which, in the closed position, forms an end region of its course that extends in the direction of the swivel axis, the end region is arranged close to an edge of the closure cover and so as to oppose the swivel axis of the closure cover, and the swivel axis, when the cover is in the closed position, lies opposite an end section, farthest from the swivel axis, which engages a front side of the filling pipe during an insertion phase, and wherein the closure cover includes a collection recess arranged near the swivel axis and a drain which leads from the recess out of the tank.

* * * * *